United States Patent [19]

Sakamoto

[11] Patent Number: 5,061,571
[45] Date of Patent: Oct. 29, 1991

[54] BIAXIALLY ORIENTED POLYESTER FILM

[75] Inventor: Seiji Sakamoto, Machida, Japan

[73] Assignee: Diafoil Company, Limited, Tokyo, Japan

[21] Appl. No.: 623,331

[22] Filed: Dec. 7, 1990

[30] Foreign Application Priority Data

Dec. 14, 1989 [JP] Japan ................... 1-324749

[51] Int. Cl.$^5$ ............................. B32B 27/36
[52] U.S. Cl. .................. 428/480; 428/688; 428/698; 428/900
[58] Field of Search ............ 428/480, 402, 143, 688, 428/694, 698, 900

[56] References Cited

U.S. PATENT DOCUMENTS 4,767,657  8/1988  Sakamoto et al. ............ 428/143
4,801,640  1/1989  Dallmann et al. ............ 524/394
5,006,589  4/1991  Sakamoto et al. ............ 524/430

FOREIGN PATENT DOCUMENTS 0345644  12/1989  European Pat. Off. .

*Primary Examiner*—Merrell C. Cashion, Jr.
*Assistant Examiner*—Hoa Thi Le
*Attorney, Agent, or Firm*—David G. Conlin; Robert F. O'Connell

[57] ABSTRACT

A biaxially oriented polyester film containing 0.01 to 4 wt %, based on the polyester film, of inorganic particles, the volumetric shape parameter being 0.02 to 0.2, the weight-average particle size being 0.05 to 3 μm, and the ratio (Dw/Dn) of the weight-average particle size (Dw) and the number-average particle size (Dn) being not more than 1.1 is disclosed. The film of the present invention has a uniform surface and shows excellent running property and wear resistance so that it is useful as a base film for a magnetic tape, for example. Thus, the film of the present invention has a high industrial value.

5 Claims, No Drawings

BIAXIALLY ORIENTED POLYESTER FILM

BACKGROUND OF THE INVENTION

The present invention relates to a biaxially oriented polyester film having a uniform surface and being excellent in running property and wear resistance.

Polyester films, in particular, biaxially oriented polyester films are widely used as a material in the industrial fields. With the recent demand for higher-grade polyester films for various purposes, they are strongly required to have uniform surfaces. However, the conventional polyester films are insufficient in wear properties represented by the drop of abrasion dusts from film surface. The improvement of wear properties has been demanded.

Improvements of wear properties have conventionally been made mainly by controlling the orientation of the film as a matrix or adding various kinds of particles in a polyester film, but are still insufficient.

As a result of studies undertaken by the present inventor so as to solve the above-described problems, it has been found that a film containing specific inorganic particles is excellent in surface properties, running properties and wear resistance. The present invention has been achieved on the basis of this finding.

SUMMARY OF THE INVENTION

The present invention provides a biaxially oriented polyester film containing 0.01 to 4 wt %, based on the film, of inorganic particles, the volumetric shape parameter of the inorganic particles being from 0.02 to 0.20, the weight-average particle size being from 0.05 to 3 μm, and the ratio (Dw/Dn) of the weight-average particle size (Dw) and the number-average particle size (Dn) being not more than 1.10.

DETAILED DESCRIPTION OF THE INVENTION

The "polyester" referred to in the present invention includes a polyester in which not less than 80% of the constitutional repeating units are ethylene terephthalate units or ethylene-2,6-naphthalate units. The polyester used in the present invention is preferred to have an intrinsic viscosity of 0.5 to 1.0, preferably 0.55 to 0.75.

The "polyester film" referred to in the present invention includes a biaxially oriented film obtained from such a polyester as a starting material and can be produced by a known method. For example, the polyester film is produced by forming a polyester into a sheet by melt extrusion ordinarily at 270° to 320° C., cooling the sheet to 40° to 100° C. into an amorphous sheet, stretching the amorphous sheet in the machine and transverse directions subsequently or simultaneously by 4 to 20 times by areal stretch ratio at 80° to 140° C., and heat treating the stretched sheet at 160° to 250° C. It is possible to stretch or heat treat the sheet in multi-stages or restretch it, if necessary.

One of the characteristics of the present invention is that the volumetric shape parameter (f) of the inorganic particles which are incorporated in a polyester film is small, namely, in the range of 0.02 to 0.20, preferably 0.04 to 0.15. The volumetric shape parameter (f) referred to in the present invention is represented by the formula:

$$f = v/D^3$$

wherein D represents the maximum diameter (μm) of the particles and v represents the volume (μm$^3$) of the particles. As the shape becomes more distorted from a sphere, f becomes far smaller than $\pi/6$.

When the volumetric shape parameter is not more than 0.2, the major axes of the particles are almost parallel to the surface of the stretched film, so that even if the surface is abraded, the particles do not easily drop from the surface. However, if the volumetric shape parameter is too small, for example, if the particle is an excessive acicular in shape, the surface protuberance is too small or the particles are broken during the film-forming process, thereby making it impossible to obtain a desired film surface. Therefore, the lower limit of the volumetric shape parameter range is set at 0.02.

Another characteristic of the present invention is that the particle size distribution of the inorganic particles is sharp. More precisely, it is necessary that the ratio (Dw/Dn) of the weight-average particle size (Dw) and the number-average particle size (Dn) is not more than 1.1, preferably not more than 1.05, more preferably not more than 1.02. If the ratio exceeds 1.1, the film surface becomes nonuniform, and undesired coarse protuberances are often observed on the film surface. The lower limit of the ratio is preferred to be 1.00.

Examples of inorganic particles which satisfy the essential requirements in the present invention, namely, the volumetric shape parameter (f) in the range from 0.02 to 0.2 and the sharp particle size distribution, in other words, the ratio of Dw/Dn of not more than 1.10, are spindle-shaped precipitated calcium carbonate which is obtained by the reaction between a milk of lime and carbon dioxide, flat barium ferrite and rod-like silicon nitride. These particles are used after or without classification. It is also possible to obtain the inorganic particles according to the process for producing monodisperse inorganic particles having various shapes which is described in, for example, Accounts of Chemical Research 1981, 14, pp 22 to 29.

Organic particles are unfavorable in the present invention because of their inferior heat resistance and insufficient slipperiness probably due to the elasticity.

The weight-average particle size of the inorganic particles used in the present invention is 0.05 to 3 μm. If the weight-average particle size is less than 0.05 μm, the slipperiness and the wear resistance of the resultant film are insufficient. On the other hand, if it exceeds 3 μm, the film surface becomes so coarse as to impair the appearance of high quality.

The mixing ratio of the inorganic particles in the film is in the range of 0.01 to 4 wt %, preferably 0.05 to 2 wt %. If the mixing ratio is less than 0.01 wt %, the running property of the film is greatly deteriorated. On the other hand, if the mixing ratio exceeds 4 wt %, the film surface becomes too coarse for practical use. Inorganic particles other than those as specified in the present invention may be used combinedly within the mixing ratio range described above.

As a method of mixing the inorganic particles with the polyester, any method may be adopted so long as the inorganic particles are uniformly dispersed in the polyester. For example, the inorganic particles may be added in any stage of the production of the polyester, or directly blended in the course of film-forming process.

As described above, it is possible to obtain a polyester film having a uniforms surface and showing excellent wear resistance and running property by using the inorganic particles specified in the present invention. The polyester film is more advantageous when the average refractive index of the film is in the range of 1.601 to 1.604. If the value is less than 1.601, the dimensional stability becomes inferior when heat is applied to the film. On the other hand, if the value exceeds 1.604, the wear resistance is lowered even if the inorganic particles specified in the present invention are used, resulting in the production of white powders when the film surface is abraded hard.

The polyester film of the present invention is preferred to have a ratio (Rz/Ra) of the ten-point average surface roughness (Rz) and the center-line average surface roughness (Ra) of 5 to 13, preferably 5 to 10, and a friction coefficient of 0.3 to 1.0, preferably 0.3 to 0.6. The thickness of the polyester film is preferably 1 to 300 μm.

The polyester film of the present invention can be used especially as a base film for a magnetic recording medium which is required to have excellent surface uniformity and wear resistance.

The present invention will be explained in more detail with reference to the following examples. The definitions and the methods of measuring various physical properties are as follows.

(1) Average Particle Size and Particle Size Distribution

The respective particle sizes were measured by an electron microscope. The weight-average particle size (Dw) was calculated as the particle size (diameter) corresponding to 50% weight fraction of the distribution of equivalent sphere values. The number-average particle size (Dn) was simultaneously obtained and the ratio (Dw/Dn) of both the particle sizes was obtained as the index of the sharpness of the particle size distribution.

(2) Uniformity of the Film Surface

The 10-point average surface roughness (Rz) and the center-line average surface roughness (Ra) were measured in accordance with Japanese Industrial Standard (JIS) B0601 and the ratio (Rz/Ra) of both the average surface roughness was obtained. The smaller the value, the more uniform surface.

(3) Average Refractive Index (n)

The maximum refractive index ($n_\gamma$) in the plane of a film, the refractive index ($n_\beta$) in the direction orthogonal thereto and the refractive index ($n_\alpha$) in the thickness direction were measured by an Abbe's refractometer produced by Atago Kogaku K. K., and the average refractive index was obtained from the following equation:

$$\bar{n} = \tfrac{1}{3}(n_\alpha + n_\beta + n_\gamma)$$

The measurement was carried out at 23° C. by using the sodium D-line.

(4) Running Property

A film was brought into contact with a fixed hard chromium-plated metal pin (6 mm in diameter) at a contact angle of 135° and was caused to run at a rate of 1 m/min while applying a load of 53 g to one end. The resistance at the other end was measured and the friction coefficient was obtained from the Euler's equation as a measure of the running property.

(5) Wear Resistance

A film was brought into contact with a fixed hard chromium-plated metal pin (6 mm in diameter) at a contact angle of 135° and was caused to run 100 m at a rate of 1 m/min at a tension of 200 g. The amount of white powder adhered to the pin was measured by eye and evaluated by the following 4 ranks.
Rank A: No adhesion
Rank B: A slight amount
Rank C: A small amount (more than in Rank B)
Rank D: A large amount

EXAMPLE 1

A polyethylene terephthalate having an intrinsic viscosity of 0.65 was obtained by an ordinary method while spindle-shaped precipitated calcium carbonate was blended to the polyester at the time of completion of the ester interchange reaction. The weight-average size was 0.4 μm, the ratio (Dw/Dn) of the weight-average particle size (Dw) and the number-average particle size (Dn) was 1.02 and the volumetric shape parameter was 0.12.

The polyester obtained was melt extruded at 290° C. to produce an amorphous sheet, stretched in the machine direction at 90° C. by 3.5 times, and in the transverse direction at 110° C. by 3.5 times, and thereafter heat treated at 225° C. to obtain a film of 15 μm thick. The average refractive index of the film obtained was 1.6035.

The results of evaluation are shown in Table 1.

EXAMPLE 2

A film was produced in the same way as in Example 1 except that flat barium ferrite as specified in Table 1 was used in place of the spindle-shaped precipitated calcium carbonate. The results of evaluation are shown in Table 1.

COMPARATIVE EXAMPLES 1 TO 3

Films were produced in the same way as in Example 1 except for varying the inorganic particles added to the polyester as shown in Table 1.

The results of evaluation are shown in Table 1.

TABLE 1

| | Inorganic Particles | | | | Film Properties | | | |
|---|---|---|---|---|---|---|---|---|
| | | Weight-average particle size (μm) | $D_w/D_n$ | Volumetric shape parameter | Mixing ratio (wt %) | Surface roughness | | Running property | Wear resistance |
| | Type | | | | | Ra (μm) | $R_z/R_a$ | | |
| Example 1 | calcium carbonate | 0.4 | 1.02 | 0.12 | 0.3 | 0.012 | 6.2 | 0.45 | A |
| Example 2 | barium ferrite | 0.3 | 1.02 | 0.08 | 0.4 | 0.010 | 7.0 | 0.48 | A |
| Comparative Example 1 | calcium carbonate | 0.4 | 1.25 | 0.12 | 0.3 | 0.015 | 13.5 | 0.44 | D |
| Comparative | calcium | 0.4 | 1.03 | 0.30 | 0.3 | 0.014 | 8.0 | 0.43 | C |

TABLE 1-continued

| | | Inorganic Particles | | | | Film Properties | | | |
| --- | --- | --- | --- | --- | --- | --- | --- | --- | --- |
| | Type | Weight-average particle size (μm) | $D_w/D_n$ | Volumetric shape parameter | Mixing ratio (wt %) | Surface roughness | | Running property | Wear resistance |
| | | | | | | Ra (μm) | $R_2/R_a$ | | |
| Example 2 Comparative Example 3 | carbonate calcium carbonate | 0.4 | 1.02 | 0.12 | 0.005 | 0.002 | 6.3 | 1≦ | C |

What is claimed is:

1. A biaxially oriented polyester film containing 0.01 to 4 wt %, based on the polyester film, of inorganic particles, the volumetric shape parameter being 0.02 to 0.2, the weight-average particle size being 0.05 to 3 μm, and the ratio (Dw/Dn) of the weight-average particle size (Dw) and the number-average particle size (Dn) being not more than 1.1.

2. The biaxially oriented polyester film according to claim 1, wherein the inorganic particles are selected from the group consisting of calcium carbonate, barium ferrite and silicon nitride.

3. The biaxially oriented polyester film according to claim 1, wherein the film has an average refractive index of from 1.601 to 1.604.

4. The biaxially oriented polyester film according to claim 1, wherein the film has a ratio of the ten-point average surface roughness and the center line average surface roughness of from 5 to 13.

5. The biaxially oriented polyester film according to claim 1, wherein the film has a friction coefficient of from 0.3 to 1.0.

* * * * *